United States Patent
Abro et al.

(10) Patent No.: US 9,421,892 B1
(45) Date of Patent: Aug. 23, 2016

(54) HEADREST WITH RETAINER

(71) Applicant: Toyota Motor Engineering & Manufacturing North America, Inc., Erlanger, KY (US)

(72) Inventors: Lauren M. Abro, Farmington Hills, MI (US); Angela Piculi, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/609,296

(22) Filed: Jan. 29, 2015

(51) Int. Cl.
*A47C 7/38* (2006.01)
*A47C 7/72* (2006.01)
*B60R 21/055* (2006.01)
*B60N 2/48* (2006.01)
*B60R 11/02* (2006.01)
*B60R 11/00* (2006.01)

(52) U.S. Cl.
CPC .......... *B60N 2/4876* (2013.01); *B60R 11/0235* (2013.01); *B60R 2011/005* (2013.01); *B60R 2011/0017* (2013.01)

(58) Field of Classification Search
CPC ............. B60N 2/4876; B60R 11/0235; B60R 2011/0017
USPC ......... 297/188.04, 217.3, 217.4, 391, 188.06, 297/188.01
See application file for complete search history.

(56) References Cited

U.S. PATENT DOCUMENTS

| 4,681,366 | A | * | 7/1987 | Lobanoff | B60N 2/4876 297/188.06 X |
| RE33,423 | E | * | 11/1990 | Lobanoff | B60N 2/4876 297/188.06 X |
| 5,816,657 | A | * | 10/1998 | Hecht | B60N 2/4879 297/391 X |
| 5,850,954 | A | | 12/1998 | Dong-Joo | |
| 6,424,055 | B1 | * | 7/2002 | Hambsch | B60N 2/4876 280/735 |

(Continued)

FOREIGN PATENT DOCUMENTS

CN 202847577 U 4/2013

OTHER PUBLICATIONS

Images of 2009 Honda Accord vehicle seat headrest, Jun. 2008, (3 pages).*

(Continued)

*Primary Examiner* — Rodney B White
(74) *Attorney, Agent, or Firm* — Christopher G. Darrow; Darrow Mustafa PC

(57) ABSTRACT

The present disclosure describes both a headrest and a seat including the headrest for use in a vehicle. The headrest is configured to retain a user device and is mountable both in a forward-facing orientation and a rearward-facing orientation relative to the vehicle. The headrest can secure the user device and allow a rear-facing passenger to view the user device from a rear-facing car seat. Alternatively, the headrest can be mounted on a seat directly in front of a front-facing passenger to allow the front-facing passenger to view and manipulate the user device.

20 Claims, 7 Drawing Sheets

(56) References Cited

U.S. PATENT DOCUMENTS

| | | | | |
|---|---|---|---|---|
| 6,619,605 | B2* | 9/2003 | Lambert | A47C 7/72 297/188.06 X |
| 6,871,356 | B2* | 3/2005 | Chang | B60R 11/0235 348/837 |
| 6,883,870 | B2* | 4/2005 | Jost | B60N 2/4808 297/217.3 |
| 6,905,167 | B2* | 6/2005 | Jost | B60N 2/4876 297/188.04 |
| 7,040,697 | B1* | 5/2006 | Tuccinardi | B60R 11/0235 297/188.04 |
| 7,149,078 | B2* | 12/2006 | Schedivy | B60N 2/4876 297/217.4 |
| 7,239,040 | B2* | 7/2007 | Kitazawa | B60K 35/00 297/217.3 |
| 7,407,227 | B1* | 8/2008 | Tuccinardi | B60R 11/0235 297/188.04 |
| 7,597,393 | B1* | 10/2009 | Tuccinardi | B60R 11/0211 297/188.04 |
| 7,679,578 | B2* | 3/2010 | Schedivy | B60N 2/4876 296/37.15 |
| 7,758,116 | B2* | 7/2010 | Hattori | B60N 2/4808 297/217.3 |
| 7,780,231 | B2* | 8/2010 | Shalam | B60N 2/4876 297/217.3 |
| 7,909,397 | B2* | 3/2011 | Shalam | B60R 11/0235 297/217.3 X |
| 7,954,894 | B2* | 6/2011 | Schedivy | B60N 2/4876 297/217.1 |
| 8,109,569 | B2* | 2/2012 | Mitchell | B60R 11/0235 297/217.3 X |
| 8,141,948 | B2* | 3/2012 | Cassellia | B60K 35/00 297/188.04 |
| 8,201,203 | B2* | 6/2012 | Vitito | B60N 2/4876 297/217.3 X |
| 8,203,657 | B2* | 6/2012 | Vitito | B60K 35/00 297/217.3 |
| 8,348,338 | B2* | 1/2013 | Galecka | B60N 2/4808 297/391 X |
| 8,485,486 | B2* | 7/2013 | Riedel | B60R 11/0235 297/217.4 X |
| 8,585,140 | B2* | 11/2013 | Chang | B60R 11/0235 297/217.3 |
| 8,625,034 | B2* | 1/2014 | Campbell | B60K 35/00 297/217.3 |
| 8,794,700 | B2 | 8/2014 | Brawner | |
| 8,851,565 | B2* | 10/2014 | Hontz | B60N 3/004 297/188.04 |
| 9,004,590 | B2* | 4/2015 | Westerink | B64D 11/0015 297/217.3 |
| 2003/0025367 | A1* | 2/2003 | Boudinot | B60N 2/4876 297/217.3 |
| 2004/0004378 | A1* | 1/2004 | Park | B60N 2/4876 297/217.3 |
| 2004/0032543 | A1* | 2/2004 | Chang | B60R 11/0235 348/837 |
| 2004/0086259 | A1* | 5/2004 | Schedivy | H04N 5/64 386/358 |
| 2004/0227861 | A1* | 11/2004 | Schedivy | B60N 2/4876 348/837 |
| 2005/0099548 | A1* | 5/2005 | Vitito | B60N 2/4876 348/837 |
| 2005/0110913 | A1* | 5/2005 | Vitito | B60R 11/0211 348/837 |
| 2005/0116943 | A1* | 6/2005 | Wohrle | B60R 11/0235 345/211 |
| 2005/0166238 | A1* | 7/2005 | Vitito | B60N 2/4876 725/77 |
| 2006/0070103 | A1* | 3/2006 | Vitito | B60K 35/00 725/77 |
| 2006/0119151 | A1* | 6/2006 | Vitito | B60K 35/00 297/217.3 |
| 2006/0148577 | A1* | 7/2006 | Vitito | B60K 35/00 463/46 |
| 2006/0175879 | A1* | 8/2006 | Chiang | B60R 11/0235 297/188.04 |
| 2007/0052266 | A1* | 3/2007 | Chu | B61D 33/005 297/217.3 |
| 2007/0057541 | A1* | 3/2007 | Huang | B60R 11/0235 297/217.3 |
| 2007/0101372 | A1* | 5/2007 | Chang | B60R 11/0235 297/217.3 X |
| 2007/0222248 | A1* | 9/2007 | Maulden | B60N 2/4876 297/217.3 X |
| 2007/0290536 | A1* | 12/2007 | Nathan | B60K 35/00 297/217.3 |
| 2008/0157574 | A1* | 7/2008 | LaRussa | B60N 2/4876 297/217.3 |
| 2008/0246319 | A1* | 10/2008 | Chang | B60R 11/0235 297/217.3 |
| 2008/0246320 | A1* | 10/2008 | Chang | B60R 11/0235 297/217.3 |
| 2008/0252111 | A1* | 10/2008 | Rothkop | B60N 3/004 297/188.04 |
| 2008/0252118 | A1* | 10/2008 | Chang | B60R 11/0235 297/217.3 |
| 2008/0252798 | A1* | 10/2008 | Vitito | B60K 35/00 348/837 |
| 2008/0272634 | A1* | 11/2008 | Vasquez | B60K 35/00 297/217.4 |
| 2009/0085383 | A1* | 4/2009 | Hicks | B60K 35/00 297/217.3 |
| 2009/0091163 | A1* | 4/2009 | Liu | B60N 2/4876 297/217.3 |
| 2009/0261638 | A1* | 10/2009 | Kuno | A47C 7/38 297/217.3 |
| 2009/0278389 | A1* | 11/2009 | Pos | B60N 2/286 297/217.3 |
| 2011/0174926 | A1* | 7/2011 | Margis | B60N 2/4876 297/217.3 |
| 2011/0278885 | A1* | 11/2011 | Procter | B60R 11/0235 297/188.04 X |
| 2012/0086247 | A1* | 4/2012 | Liu | B60N 2/4876 297/217.3 |
| 2012/0097831 | A1 | 4/2012 | Olukotun et al. | |
| 2012/0126605 | A1* | 5/2012 | Gross | B60N 2/4864 297/410 |
| 2012/0139303 | A1* | 6/2012 | Westerink | B64D 11/0015 297/188.04 X |
| 2013/0107449 | A1 | 5/2013 | Su et al. | |
| 2013/0119727 | A1 | 5/2013 | Lavelle et al. | |
| 2013/0181492 | A1 | 7/2013 | Prescott et al. | |
| 2013/0259261 | A1 | 10/2013 | Mitchell | |
| 2014/0001217 | A1 | 1/2014 | Jolda et al. | |
| 2014/0077539 | A1* | 3/2014 | Brawner | B60R 11/02 297/217.3 |
| 2014/0084648 | A1* | 3/2014 | Wen | B60N 2/4876 297/217.3 |
| 2014/0268544 | A1 | 9/2014 | Johnson | |
| 2014/0284972 | A1* | 9/2014 | Riedel | B64D 11/0015 297/188.04 |
| 2015/0035325 | A1* | 2/2015 | Gagnier | B60R 7/043 297/188.04 |
| 2015/0123433 | A1* | 5/2015 | Lamb, Jr. | B60R 11/0229 297/188.04 X |
| 2015/0130231 | A1* | 5/2015 | Lindsay | B60N 2/2812 297/120 |
| 2015/0313367 | A1* | 11/2015 | Grooters | H04N 7/15 297/217.3 |

OTHER PUBLICATIONS iPADKET, Dec. 2, 2012, [retrieved Jan. 29, 2015] retrieved from the Internet: <http://www.amazon.com/iPADKET-DURABLE-Headrest-Airplane-Holder/dp/B004FDF0YO>, 1 page.
DURAGADGET Large In-Car Headrest Mount/Holder/Support with Adjustable Arms for Acoustic Solutions 10-inch Portable DVD Player, [retrieved Jan. 28, 2015] retrieved from the Internet: <http://guide.alibaba.com/shop/duragadget-large-in-car-headrest-mount-holder-support-with-adjustable-arms-for-acoustic-solutions-10-inch-portable-dvd-player_4876983.html>, 3 pages.
SmartLogic PerfectMatch Headrest System (8GB), [retrieved Jan. 28, 2015] retrieved from the Internet: <http://www.vizualogic.com/products/perfectmatch-headrests-players/smartlogic-perfectmatch-headrest-system-8gb.html>, 1 page.

(56) References Cited

OTHER PUBLICATIONS

WebMD Baby's First Year Community: Question about dvd player for rear-facing carseat, [retrieved Jan. 28, 2015] retrieved from the Internet: <http://forums.webmd.com/3/newborn-and-baby-exchange/forum/8547>, 3 pages.

New Android Tablet Headrest Monitors from Vizualogic, Published May 30, 2013, retrieved from the Internet: <https://www.youtube.com/watch?v=OfkJr_dc2To>, retrieved Jan. 15, 2016 (2 pages).

Imagination Productions Inc. U.S.A., "Original iPADKET Headrest Mount for iPad", retrieved from the Internet: <http://www.ipadket.com/ipadket-original.html>, retrieved Jan. 15, 2016 (3 pages).

\* cited by examiner

HEADREST WITH RETAINER

TECHNICAL FIELD

The present disclosure relates generally to a headrest for use in a vehicle, and more specifically, to a reversible headrest including a retainer portion configured to secure a user device.

BACKGROUND

In many modern vehicles, passengers may want to operate user devices in order to pass time. The user devices can be tablets, cell phones, smartphones, MP3 players, DVD players, Blu-ray players, and the like. However, it may be inconvenient for passengers to hold on to user devices for long periods of time. This can be especially problematic where the passenger is a young child in a rear-facing car seat. Allowing a child to hold onto a user device can result in the child dropping or damaging the user device, distracting the driver, or creating a safety concern.

As more children at greater ages are required to ride in a vehicle in a rearward-facing position, having a secure place to mount a user device accessible to rear-facing children may be advantageous both to the driver and the other passengers in the vehicle.

SUMMARY

A headrest configured to secure a user device both in a forward-facing and rearward-facing orientation and two embodiments of a seat including the headrest are disclosed. The user device can be secured in a retainer portion of the headrest. The headrest can be mountable on a seat in a vehicle both in a forward-facing orientation and a rearward-facing orientation relative to the vehicle.

In one example, the headrest can include a first side including a cushioned portion and a second side opposing the first side including a retainer portion operative to secure a user device. The headrest can have a forward-facing orientation with the first side facing forward within the vehicle and a rearward-facing orientation with the second side facing forward within the vehicle.

In another example, a seat for use in a vehicle is disclosed. The seat can include a backrest and a headrest. The headrest can be mounted on the backrest. The headrest can include a first side including a cushioned portion and a second side opposing the first side including a retainer portion operative to secure a user device. The headrest can have a forward-facing orientation with the first side facing forward in the vehicle and a rearward-facing orientation with the second side facing forward in the vehicle.

In another example, a seat for use in a vehicle is disclosed. The seat can include a base configured to receive and support a rear-facing car seat. The seat can also include a backrest including an engaging portion and a headrest. The headrest can have a first side including a cushioned portion, a second side including a retainer portion and opposing the first side, and a mounting portion for securing the headrest to the engaging portion of the backrest. The headrest can have a forward-facing orientation where the first side faces the rear-facing car seat and a rearward-facing orientation where the second side faces the rear-facing car seat.

BRIEF DESCRIPTION OF THE DRAWINGS

The description herein makes reference to the accompanying drawings wherein like reference numerals refer to like parts throughout the several views, and wherein.

DETAILED DESCRIPTION

The present disclosure describes a headrest for use in a vehicle configured to retain a user device and operable both in a forward-facing orientation and a rearward-facing orientation relative to the vehicle. In the rearward-facing orientation, the headrest can secure the user device and allow a rear-facing passenger, such as a child in a rear-facing car seat, to view and, optionally, manipulate, the user device secured in the headrest. Alternatively, in the forward-facing orientation, the headrest can be installed in a seat directly in front of a passenger, such as an older child in a front-facing car seat or booster, to allow the front-facing passenger to view and manipulate the user device.

Figure 1:
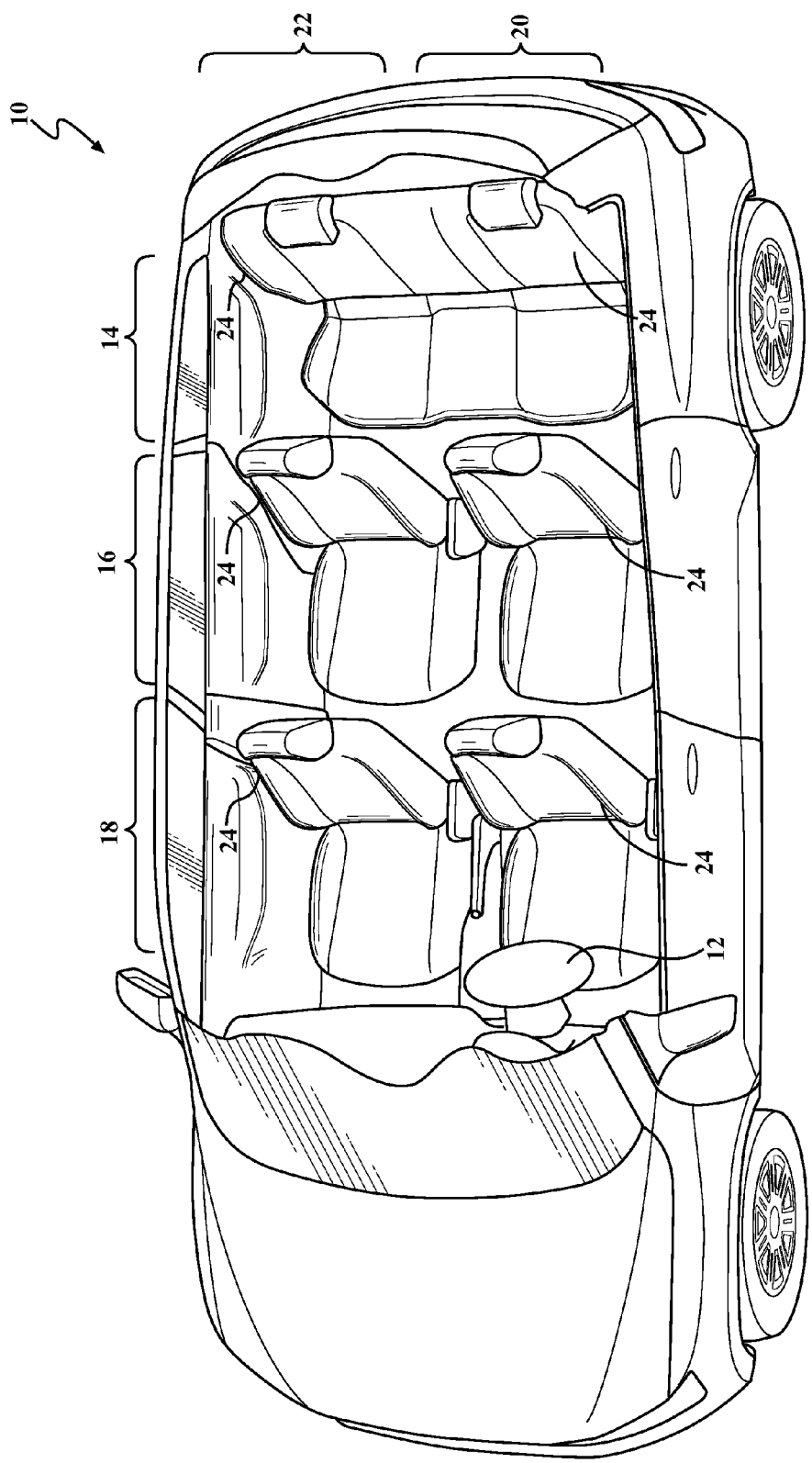
FIG. 1 is a top view of a vehicle.

Referring to FIG. 1, a top-view of a vehicle 10 is shown. An interior of the vehicle 10 can be divided into several sections, both laterally and longitudinally, based on a location respective to a steering wheel 12. The interior can be divided laterally into a first row 14, a second row 16, and a third row 18. Additionally, the interior can be divided longitudinally into a driver's side 20 and a passenger's side 22. Thus, each section can be referred to by its respective lateral and longitudinal section. For example, the section directly behind the driver's seat can be referred to as the second row 16 driver's side 20.

Each section can include at least one seat 24. In the example of FIG. 1, there are two seats 24 in the first row 14, two seats 24 in the second row 16, and two seats 24 having a common bench base in the third row 18. Thus, in this example, there are at least four positions where a rear-facing passenger could be seated within a car seat: the second row 16 driver's side 20, the third row 18 driver's side 20, the second row 16 passenger's side 22, and the third row 18 passenger's side 22. Other seating configurations are also possible.

Figure 2:
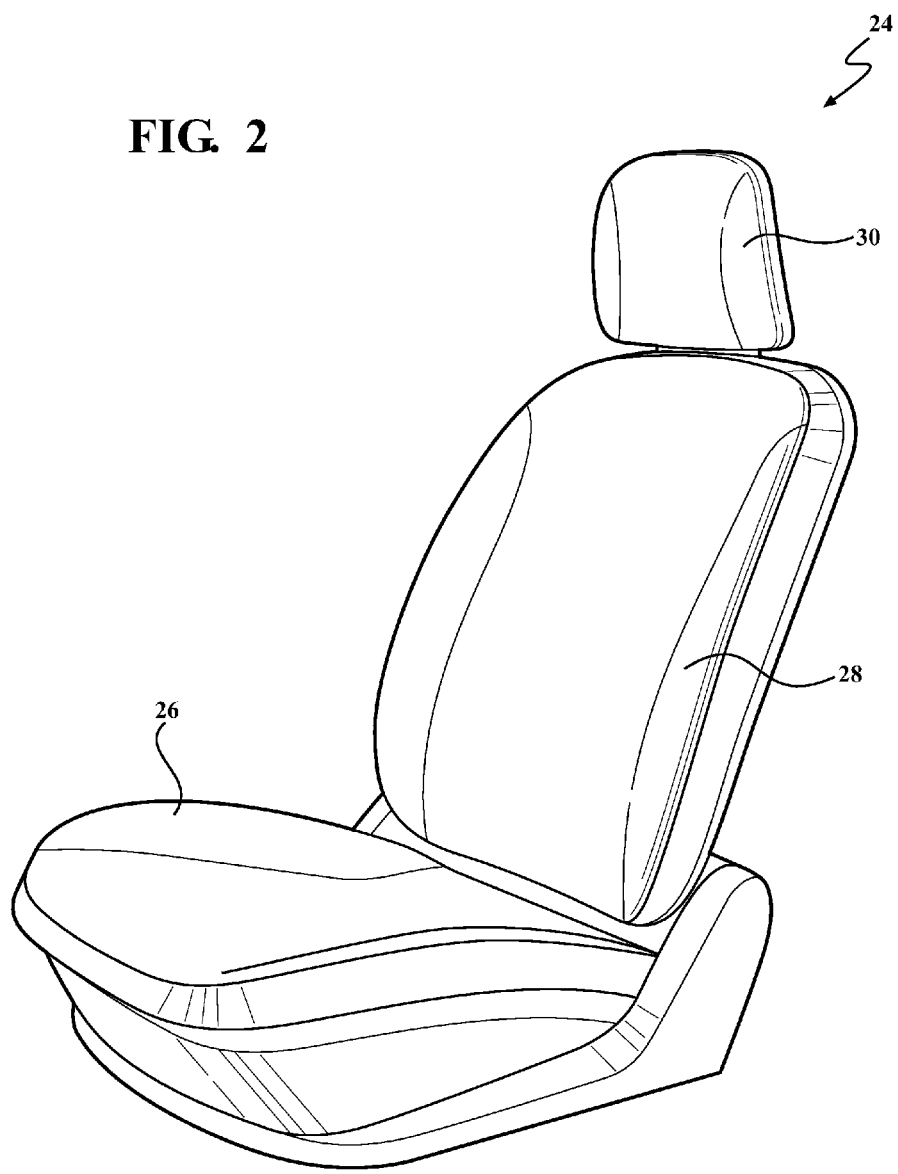
FIG. 2 is a perspective view of a seat in the vehicle of FIG. 1.

Referring now to FIG. 2, a perspective view of the seat 24 in the vehicle 10 is shown, for example, as located in either the second row 16 or the third row 18 as described in FIG. 1. The seat 24 can include a base 26, a backrest 28, and a headrest 30. The base 26 can be operative to support, for example, a passenger, a car seat, groceries, or any other objects that can be located on a seat 24. The backrest 28 can support a passenger's upper body in a comfortable position when seated in a forward-facing orientation. The headrest 30 can support the passenger's head and neck when seated in a forward-facing orientation.

Figure 3:
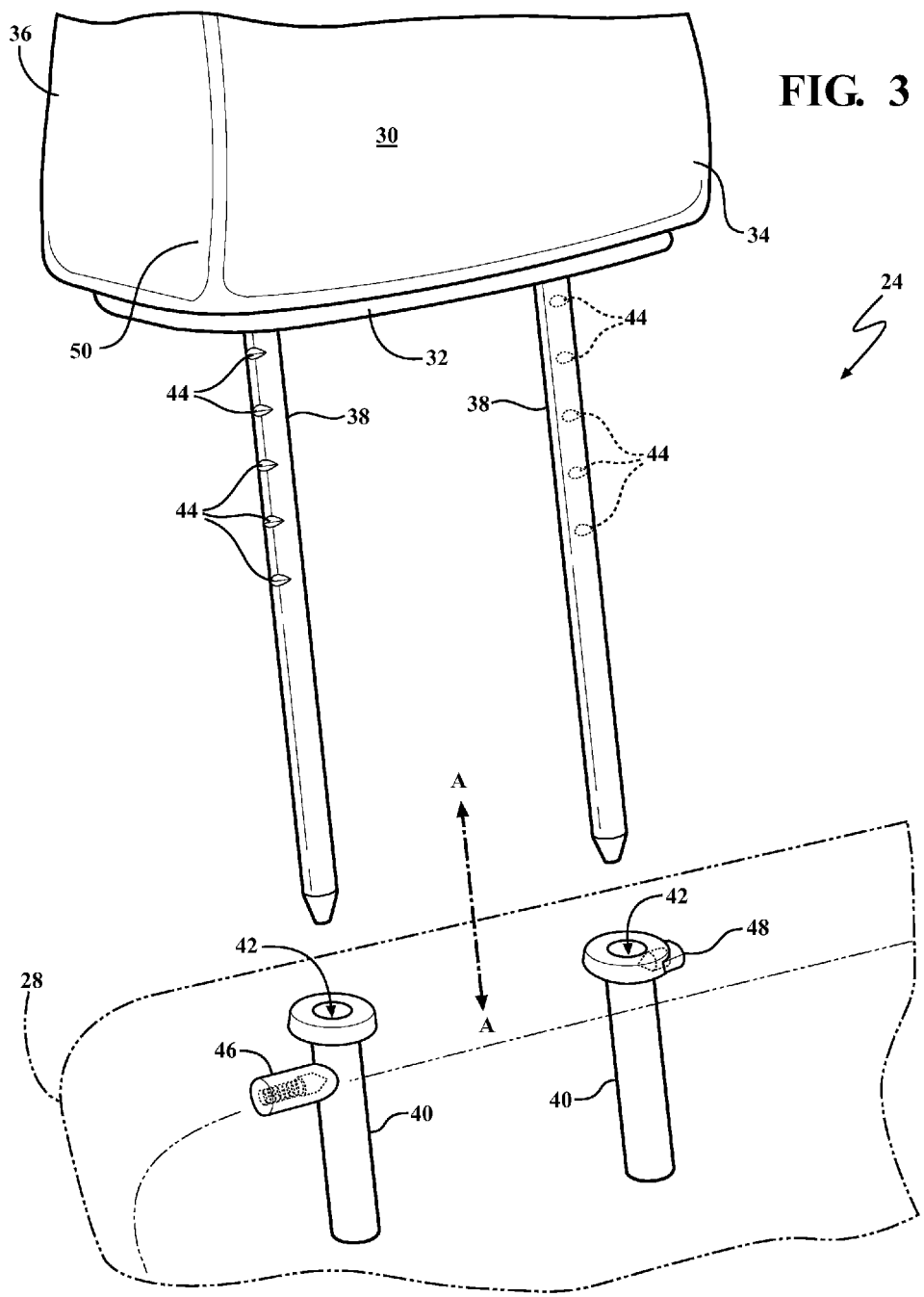
FIG. 3 is an exploded view of a headrest of the seat of FIG. 2.

Referring now to FIG. 3, an exploded view of the headrest 30 of the seat 24 is shown. The headrest 30 can include a mounting portion 32, a first side 34, and a second side 36. The mounting portion 32 can support the headrest 30 in a fixed position. The mounting portion 32 can include at least one post 38 extending from the headrest 30 in order to attach the headrest 30 to the backrest 28 of the seat 24. FIG. 3 shows the mounting portion 32 having two posts 38. The two posts 38 in this example can be mechanically aligned and selectively inserted into engaging portions 40 on the backrest 28 of the seat 24. The posts 38 can pass through openings 42 in the engaging portions 40 and lock into place when at least one notch 44 on the surface of each post 38 is engaged by a spring arm 46 positioned in the respective engaging portions 40. The spring arms 46 can be disengaged from the respective notches 44 via a release button 48. Here, a single release button 48 is shown, though other locking and unlocking mechanisms are also possible.

The first side 34 of the headrest 30 can include a cushioned portion 50. The cushioned portion 50 can be comprised of any one of stiff foam, softer foam, gel, feathers, or any other means of forming a cushioned surface for use in supporting a passenger's head and neck. When a passenger is seated on the seat 24 in a front-facing position, the first side 34 of the headrest 30 can face forward relative to the interior of the vehicle 10, that is, the headrest 30 can have a forward-facing orientation. In this configuration, the head and neck of the passenger may be supported both for comfort and safety reasons while the passenger is seated.

The headrest 30, including the mounting portion 32, can be symmetrical along an axis A-A. The headrest 30, in being symmetrical about the axis A-A, can be mounted both in the forward-facing orientation described above and a rearward-facing orientation relative to the interior of the vehicle 10. For example, when the headrest 30 is positioned on the second row 16 driver's side 20 seat 24, the first side 34 of the headrest 30 can face the first row 14 in the forward-facing orientation. Alternatively, the second side 36 of the headrest 30 can be positioned to face the first row 14, this being consistent with the rearward-facing orientation for the headrest 30.

Figure 4:
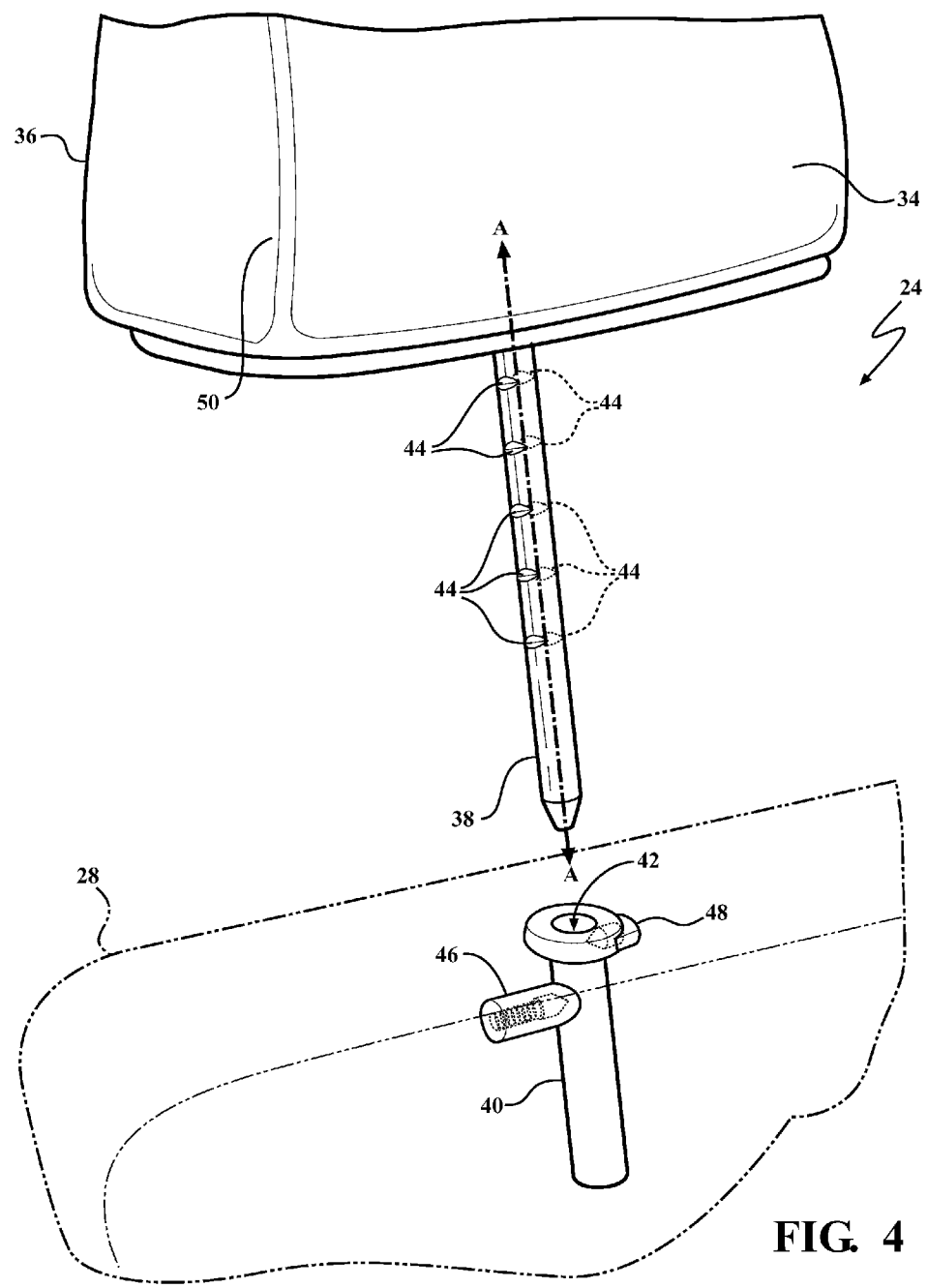
FIG. 4 is an exploded view of an alternative embodiment of the headrest of FIG. 3.

Referring now to FIG. 4, an exploded view of an alternative embodiment of the headrest 30 is shown. The headrest 30 again includes the mounting portion 32, the first side 34, and the second side 36. In this example, the mounting portion 32 includes a single post 38. The single post 38 passes through the opening 42 of the engaging portion 40 in order to attach the headrest 30 to the backrest 28 of the seat 24. The headrest 30, including the mounting portion 32, is symmetrical about the A-A axis, allowing the headrest 30 to be inserted into the backrest 28 of the seat 24 both in the forward-facing orientation and the rearward-facing orientation The headrest 30 may be selectively mounted to the backrest 28 by inserting the single post 38 into the opening 42 of the engaging portion 40 of the backrest 28 of the seat 24. The at least one notch 44 on the surface of the single post 38 may be engaged by the spring arm 46. The spring arm 46 may be disengaged from the at least one notch 44 and the headrest 30 removed when the release button 48 is selected. Any means of mounting the headrest 30 known in the art is contemplated in the present disclosure, so long as the headrest 30 is capable of being mounted both in the forward-facing orientation and the rearward-facing orientation.

Figure 5:
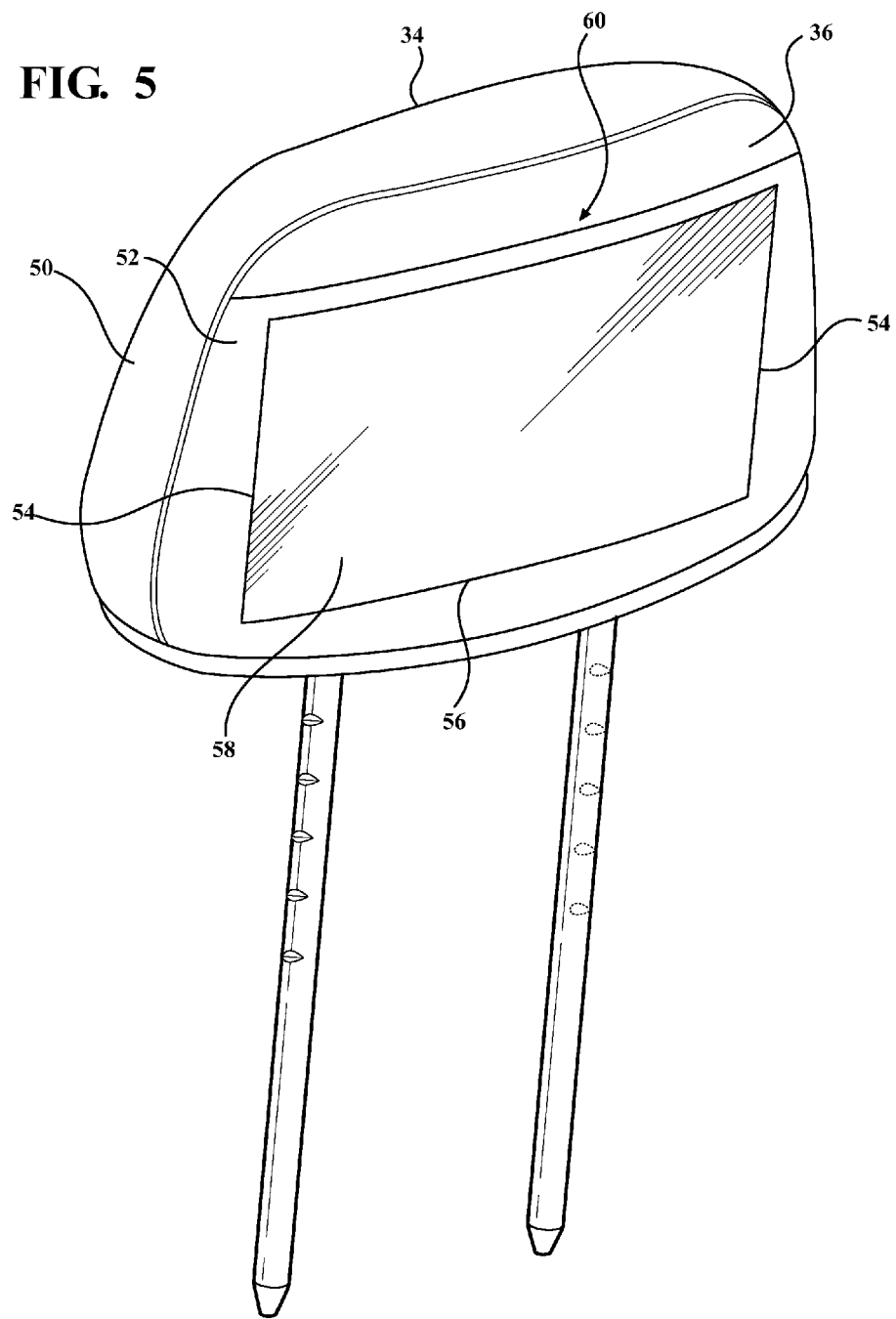
FIG. 5 is a backside perspective view of the headrest of FIG. 3.

Referring now to FIG. 5, a backside perspective view of the headrest 30 of FIG. 3 is shown. The second side 36 of the headrest 30 can oppose the first side 34. Also, the second side 36 can include a retainer portion 52. The retainer portion 52 can be a pocket or a series of smaller pockets positioned on the perimeter of the second side 36 of the headrest 30. The retainer portion 52 can be secured or bonded to the second side 36 of the headrest 30 via any one of adhesive, stitching, stapling, or any other means of bonding. As shown in this example, the retainer portion 52 can include two side portions 54 and a bottom portion 56, each of the individual portions 54, 56 serving as part of a larger singular pocket.

The retainer portion 52 can also include a film 58. The film 58 can cover an opening 60 between the side portions 54 and the bottom portion 56. The film 58 can be comprised of a translucent material. As used here, translucent can include translucent, semi-transparent, and transparent. Additionally, the film 58 can be comprised of a touch-sensitive material. By touch-sensitive material, it is contemplated that the material can be configured to receive touch gestures from a user and allow the user to operate a user device. A touch gesture can include a physical touch by the user, or any other means, such as non-touch motion, meant to operate the user device.

Figure 6:
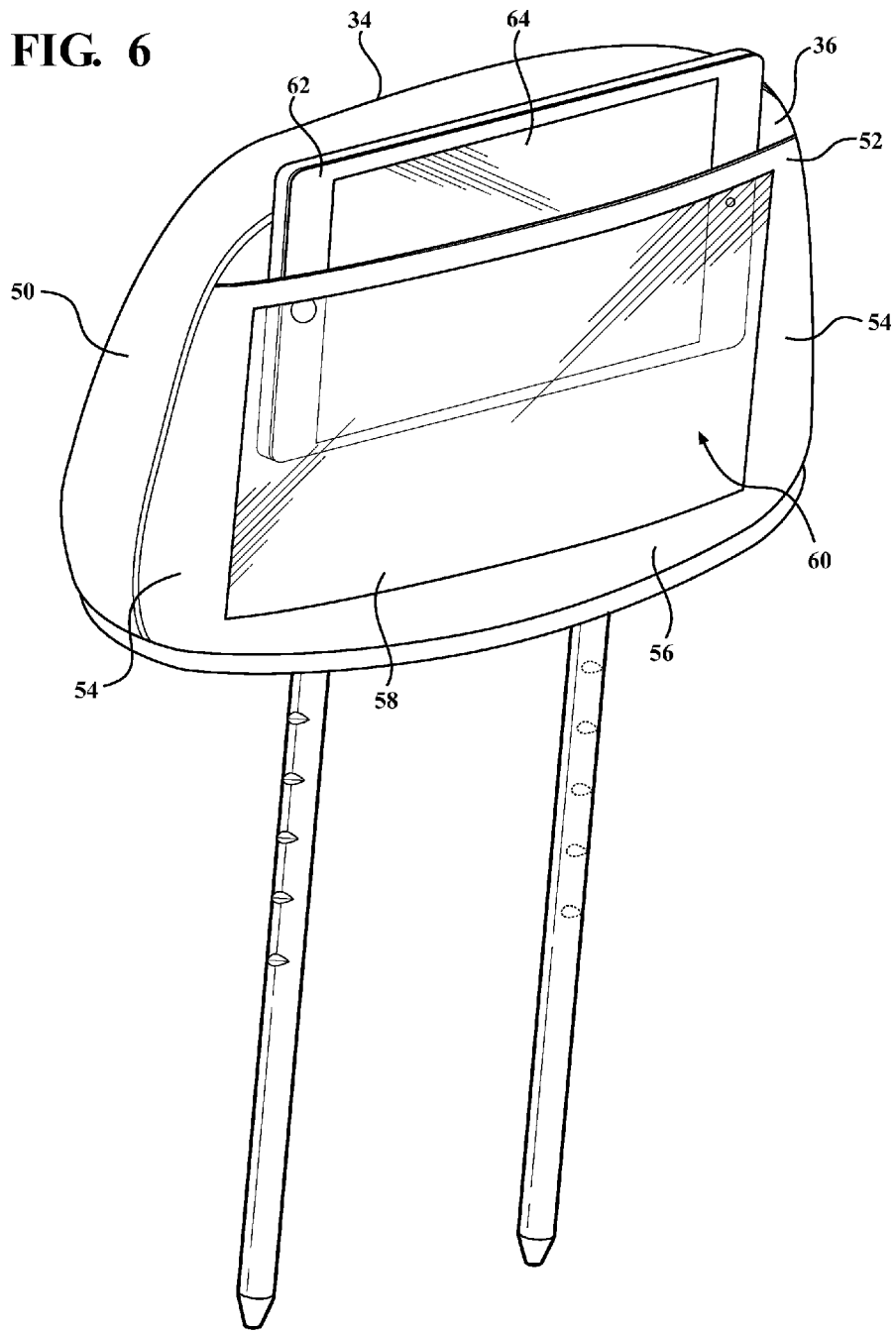
FIG. 6 is an alternative backside perspective view of the headrest of FIG. 3 including a user device.

Referring now to FIG. 6, an alternative backside perspective view of the headrest 30 of FIG. 3 including a user device 62 is shown. The user device 62 can be, but is not limited to, a tablet, a cell phone, a smartphone, an MP3 player, a DVD player, a Blu-ray player, and the like. In use, the retainer portion 52 can be stretched or pulled open by a passenger, and the passenger can insert or slide the user device 62 into the opening 60 between the retainer portion 52 and the second side 36 of the headrest 30. Once the user device 62 is positioned within the retainer portion 52, the user device 62 is secured against the headrest 30 for safety and convenience. The passenger can then view and manipulate the user device 62 while it is secured in the retainer portion 52 through the opening 60 and, optionally, through the film 58 if the film 58 is present across the retainer portion 52.

The film 58 can extend substantially across the retainer portion 52. The film 58 can extend between the side portions 54 and down to the bottom portion 56, where a screen 64 on the user device 62 is viewable or substantially viewable by the user through the opening 60. Again, the film 58 is optional and may be omitted where the user device 62 is sized substantially the same as the retainer portion 52. When present, the film 58 can be permanently attached to the retainer portion 52, or the film 58 can be removable from the retainer portion 52 by a passenger. The film 58 can also retain the user device 62 where the user device 62 is smaller than or up to the same size as the opening 60.

Figure 7:
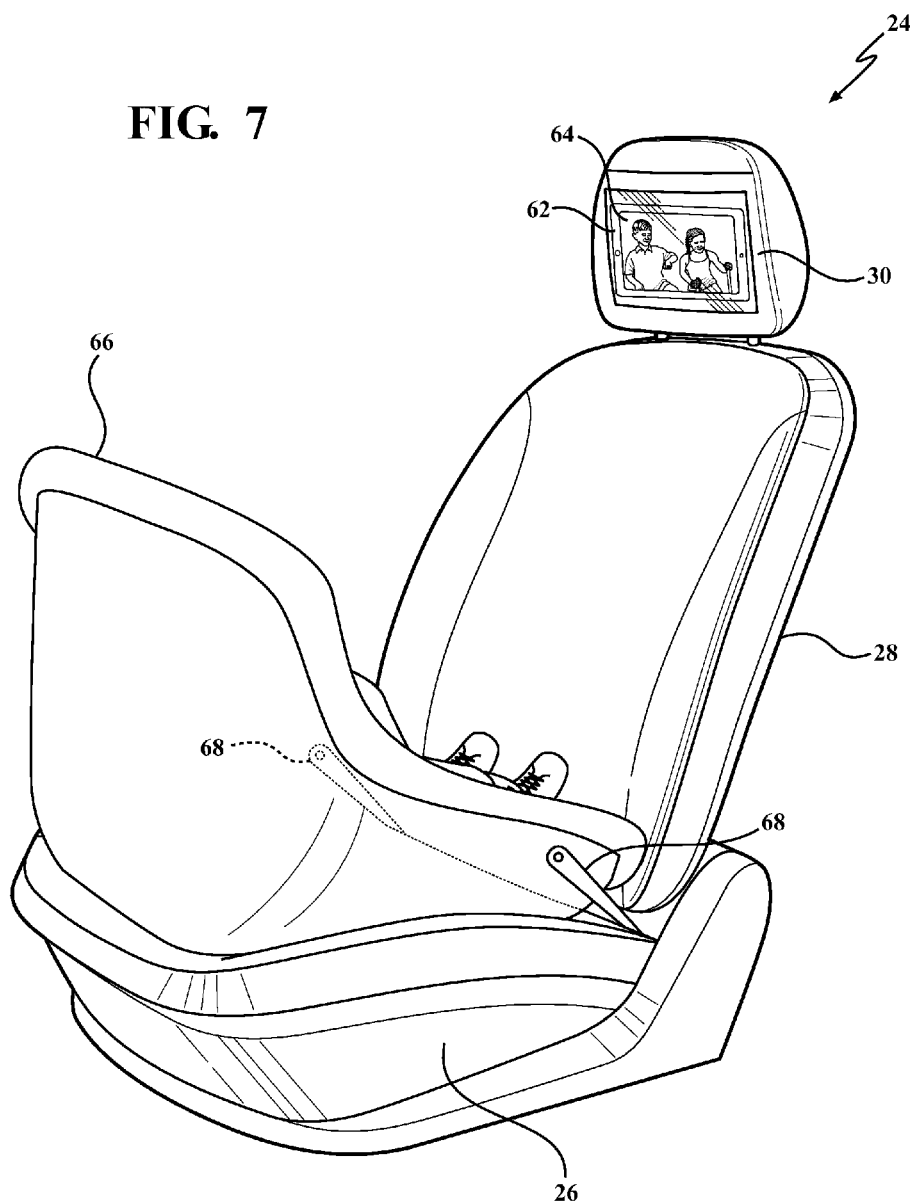
FIG. 7 is a perspective view of the seat of FIG. 2 including the headrest of FIG. 5 and a rear-facing car seat.

Referring now to FIG. 7, a perspective view of the seat 24 of FIG. 2 including the headrest 30 and a rear-facing car seat 66 is shown. As stated above, the seat 24 includes the base 26, the backrest 28, and the headrest 30. The headrest 30 can have a forward-facing orientation and a rearward-facing orientation. The forward-facing orientation can be designed for the first side 34 of the headrest 30 to face forward relative to the orientation of the seat 24 within the vehicle 10. The rearward-facing orientation can be designed for the second side 36 of the headrest 30 to face forward relative to orientation of the seat 24. Note here that, in FIG. 7, the headrest 30 is mounted in the rearward-facing orientation, whereas in FIG. 2, the headrest 30 is mounted in the forward-facing orientation.

The seat 24 also includes the rear-facing car seat 66 mounted on the base 26. The rearward-facing orientation of the headrest 30 is such that the second side 36 of the headrest 30 faces the rear-facing car seat 66. The rear-facing car seat 66 can be secured to the base 26 of the seat 24 using anchors 68 positioned on opposing sides of the rear-facing car seat 66. When a rearward-facing passenger is occupying the rear-facing car seat 66, he or she can view and interact with the user device 62, for example, viewing the screen 64 on the user device 62 while the user device 62 is secured in the headrest 30.

In an alternative embodiment, the rear-facing car seat 66 can instead be a front-facing car seat or a seated passenger. Here, the headrest 30 can be positioned in the forward-facing orientation on a different seat 24 so that a passenger seated in the seat 24 can view the user device 62 on the headrest 30 positioned on a seat 24 directly in front of him or her. Referring to FIG. 1 for an example, a passenger seated in the third row 18 driver's side 20 seat 24 can view a user device 62 secured in the headrest 30 of the second row 16 driver's side 20 seat 24 when the headrest 30 has a forward-facing orientation.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the claims, which scope is to be accorded the broadest interpretation so as to encompass all such modifications and equivalent structures as is permitted under the law.

What is claimed is:

1. A headrest for use in a vehicle, comprising:
a first side comprising a cushioned portion;
a second side opposing the first side;
a retainer portion formed as an integral unit with the headrest, the retainer portion overlaying at least a portion of the second side, a pocket being defined between the retainer portion and the second side, the pocket being configured to receive a user device therein, the pocket including a plurality of sides, one of the sides being open to allow the user device to be selectively inserted into or removed from the pocket, the retainer portion including an opening through which the user device is viewable; and
a mounting portion, the mounting portion including at least one post extending from the headrest,
wherein the headrest has a forward-facing orientation with the first side facing forward within the vehicle and a reversed, rearward-facing orientation with the second side facing forward within the vehicle,
the headrest being selectively removable and mountable in the forward facing orientation and the reversed, rearward facing orientation on a backrest of a first seat in the vehicle,
whereby, in the forward-facing orientation, the user device received in the pocket is viewable to a front-facing passenger in a second seat located behind the first seat, and whereby, in the reversed, rearward-facing orientation, the user device received in the pocket is viewable to a passenger in a rear-facing child seat supported on the first seat.

2. The headrest of claim 1, wherein the retainer portion includes a film extending substantially across at least the opening of the retainer portion.

3. The headrest of claim 2, wherein the film is comprised of a translucent material.

4. The headrest of claim 2, wherein the film is comprised of a touch-sensitive material.

5. A seat for use in a vehicle, comprising:
a backrest; and
a headrest mounted on the backrest, the headrest comprising:
a first side comprising a cushioned portion;
a second side opposing the first side;
a retainer portion formed as an integral unit with the headrest, the retainer portion overlaying at least a portion of the second side,
a pocket being defined between the retainer portion and the second side, the pocket being configured to receive a user device therein, the pocket including a plurality of sides, one of the sides being open to allow the user device to be selectively inserted into or removed from the pocket, the retainer portion including an opening through which the user device is viewable; and
a mounting portion, the mounting portion including at least one post extending from the headrest,
the headrest being selectively removable and mountable on the backrest in a forward-facing orientation with the first side facing forward in the vehicle and a reversed rearward-facing orientation with the second side facing forward in the vehicle,
whereby, in the forward-facing orientation, the user device received in the pocket is viewable to a front-facing passenger in a second seat located behind the seat, and
whereby, in the reversed, rearward-facing orientation, the user device received in the pocket is viewable to a passenger in a rear-facing child seat supported on the seat.

6. The seat of claim 5, wherein the second side is angled relative to the backrest at less than about 180 degrees when the headrest is in the reversed, rearward-facing orientation.

7. The seat of claim 5, wherein the headrest includes upholstery, and wherein the retainer portion is formed as part of the upholstery of the headrest.

8. The seat of claim 5, wherein the retainer portion includes a film extending substantially across at least the opening of the retainer portion.

9. The seat of claim 8, wherein the film is comprised of a translucent material.

10. The seat of claim 8, wherein the film is comprised of a touch-sensitive material.

11. The seat of claim 5, wherein the seat is any one of a second row seat and a third row seat.

12. A seat for use in a vehicle comprising:
a base configured to receive and support a rear-facing car seat;
a backrest comprising an engaging portion; and
a headrest comprising:
a first side comprising a cushioned portion;
a second side opposing the first side;
a retainer portion formed as an integral unit with the headrest, the retainer portion overlaying at least a portion of the second side, a pocket being defined between the retainer portion and the second side, the pocket being configured to receive a user device therein, the pocket having a plurality of sides, one of the sides being open to allow the user device to be selectively inserted into or removed from the pocket, the retainer portion including an opening through which the user device is viewable; and
a mounting portion for securing the headrest to the engaging portion of the backrest;
the headrest being selectively removable and mountable in a forward-facing orientation and a reversed, rearward-facing orientation on the backrest,
wherein, in the forward-facing orientation, the first side faces the rear-facing car seat, whereby the user device received in the pocket is viewable to a front-facing passenger in a second seat located behind the seat, and
wherein, in the reversed, rearward-facing orientation, the second side faces away from the rear-facing car seat, whereby the user device received in the pocket is viewable to a passenger in the rear-facing car seat.

13. The seat of claim 12, wherein the second side being angled relative to the backrest at less than about 180 degrees when the headrest is in the reversed, rearward-facing orientation.

14. The seat of claim 12, wherein the headrest includes upholstery, and wherein the retainer portion is formed as part of the upholstery of the headrest.

15. The seat of claim 12, wherein the retainer portion of the headrest includes a film extending substantially across at least the opening of the retainer portion.

16. The seat of claim 15, wherein the film is comprised of a translucent material.

17. The seat of claim 15, wherein the film is comprised of a touch-sensitive material.

18. The seat of claim 12, wherein the mounting portion of the headrest comprises at least one post extending from the headrest into the engaging portion of the backrest.

19. The headrest of claim 1, wherein the second side is angled relative to the at least one post at less than about 180 degrees.

20. The headrest of claim 1, wherein the headrest includes upholstery, and wherein the retainer portion is formed as part of the upholstery of the headrest.

* * * * *